R. R. McCORMICK.
TRENCHING TOOL.
APPLICATION FILED SEPT. 15, 1915.

1,220,666.

Patented Mar. 27, 1917.

Witnesses:
W. J. Smith
Florence Mitchell

Inventor:
Robert R. McCormick
by Frank D. Thomason
Atty.

UNITED STATES PATENT OFFICE.

ROBERT R. McCORMICK, OF CHICAGO, ILLINOIS.

TRENCHING-TOOL.

1,220,666.  Specification of Letters Patent.  Patented Mar. 27, 1917.

Application filed September 15, 1915.  Serial No. 50,749.

*To all whom it may concern:*

Be it known that I, ROBERT R. MCCORMICK, a citizen of the United States, residing at Chicago, in the county of Cook and State of Illinois, have invented new and useful Improvements in Trenching-Tools, of which the following is a full, clear, and exact description.

My invention relates particularly to the shovel constituting part of the accouterment of infantry.

The objects of my invention are, first, to use it to protect the head or body, and, second, to facilitate the carrying of the scoop of the shovel. This I accomplish by the simple means hereinafter fully described, and as particularly set forth in the claims.

Figure 1:
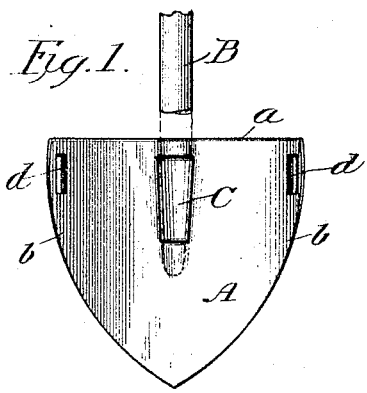
Figure 1 is a view looking at the concave side of the scoop of my improved shovel.

Referring to the drawings, A represents the scoop of my improved trenching shovel. I prefer to make the upper transverse edge $a$ of this scoop in a plane at right angles to the axis of the handle B, and to make the side edges $b, b$, parallel to each other for a short distance down from said upper edge, and then correspondingly curved toward each other to its digging point. The socket C for the lower tapered end of the handle is, preferably, made by providing the scoop with a couple of transverse slits near its upper edge $a$, midway between its side edges $b, b$, and then bending the web between these slits rearwardly to form a socket that will project from the convexed side of the scoop, substantially as shown in the drawings. The length of the lower slit is, preferably, shorter than the uppermost one so as to provide a tapering socket which will accommodate the tapered end of the handle, and the bottom of the scoop, alining with the axis of the handle, is provided with a disappearing ridge on the concaved side of the scoop, which is most prominent at the upper edge of the same and practically disappears about midway the length thereof to provide a seat for the end of the handle that will prevent lateral motion thereof. In order to prevent the scoop rotating on the handle, I prefer to flatten the side of the end of the latter coming in contact with the under side thereof.

Figure 2:
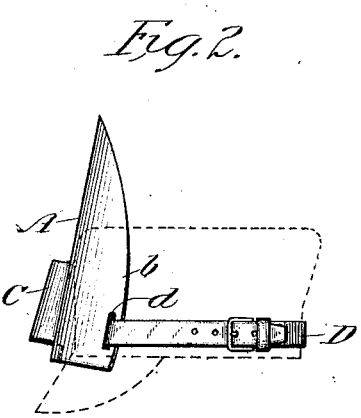
Fig. 2 is a side view thereof showing it strapped to a cap, which latter is shown in dotted lines.

As thus constructed, the scoop can be quickly mounted on the handle, and just as quickly removed therefrom. When separated from said scoop, the handle can be secured in the knapsack of the soldier, or otherwise suitably disposed of, and the scoop is inverted and worn and utilized as a shield for the top of his head. To accomplish this, I provide the scoop with longitudinal slots $d, d$, that are parallel to the sides near the top edge thereof, and I thread through these slots a strap D, or its equivalent, in such manner that the strap will bridge across the concaved side of the scoop when fastened to the head of the wearer, either directly or outside of his cap, substantially as shown in Fig. 2 of the drawings, and hold the scoop out from the forehead so that the rigid surface thereof will not irritate the head. In this position the scoop acts as a shield, and greatly reduces the exposed part of the head to the fire of the enemy when it is necessary to raise the head above the surface of the dirt heap or mound in front of the trench.

Figure 3:
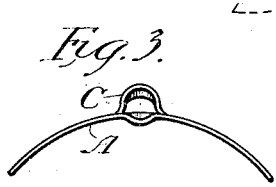
Fig. 3 is a top edge view of the scoop alone.
Figure 4:
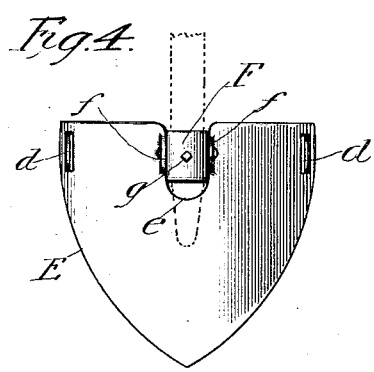
Fig. 4 is a view similar to Fig. 1 showing a slightly modified construction of said scoop.
Figure 5:
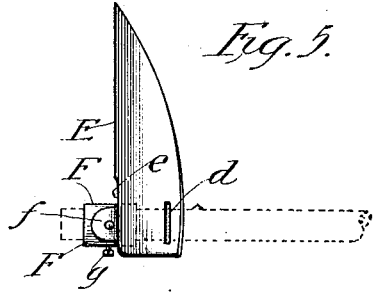
Fig. 5 is a view similar to Fig. 2 of said modification showing it mounted on the barrel of a gun.
Figure 6:
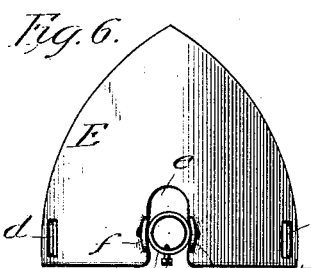
Fig. 6 is a view of the back of a fragment of the scoop of said modification.

In Figs. 4, 5 and 6, I show a modified construction of my invention in order to adapt it not only for digging and shielding the head, but also for mounting it near the sight upon the barrel of a gun in position to afford protection for the head. In this modification, a longitudinally elongated recess $e$ is made in the upper edge of a scoop E, midway between its sides and the longitudinal edges of this recess are bent so as to project from the convexed side of the scoop and suitably shaped to form pivotal lugs $f, f$. A cylindrical socket F is placed between and pivotally connected to these lugs, and a handle (which is shown in dotted lines) is inserted through this socket until it is wedged tightly therein and a set-screw $g$ is tapped through said socket, which is tightened to prevent the accident of withdrawal of the handle. When it is desired to use scoop E as a shield it is removed from the handle and mounted upon the head of the soldier, substantially as shown in Fig. 2, or is mounted upon the end of the gun barrel, by turning sleeve F at right angles to the position in which it is shown in Fig. 4, and slipping it over the end of the barrel and securing it thereon by set-screw $g$. The depth of recess $e$ is such that the rifleman can sight through it and aim his weapon. In every other respect—except the changes in construction necessary for the use of sleeve F—scoop E is similar in construction to scoop A of the preferred form of my invention, shown in Figs. 1, 2 and 3.

It is obvious that minor details of construction may be made in my invention in order to adapt it to the different headgears and the accouterments of the soldiers. All such changes, I desire to be understood as contemplating within the scope of my invention, the principal object of which, broadly speaking, is to use the scoop of the shovel as a shield for the greater protection of the head of the soldier from the fire of the enemy.

What I claim as new is:

1. A trenching tool comprising a handle, a scoop removably mounted on said handle and provided with a longitudinally extending recess in its upper edge, a sleeve open at both of its ends pivoted in said recess, and providing a socket through the ends of which the adjacent end of said handle may be passed.

2. A trenching tool comprising a handle, a scoop removably mounted on said handle and having a longitudinally extending recess in its upper edge the longitudinal edges of which are formed into rearwardly projecting lugs, a sleeve pivoted between said lugs and providing a socket for the adjacent end of said handle.

3. A trenching tool comprising a handle, a scoop, and means for removably securing the same to said handle to form a trench tool or to secure same to the barrel of a gun to form a shield.

4. A trench tool comprising a handle, a scoop removably secured to said handle, a recess in the scoop, a sleeve mounted in said recess to receive said handle or to receive the barrel of a gun, said sleeve being pivotally mounted upon the scoop to permit said scoop to be positioned upon the barrel to form a shield, and the recess forming an aperture which alines with the gun barrel when the scoop is arranged in the last named position.

In witness whereof I have hereunto set my hand and seal this 8th day of September, 1915.

ROBERT R. McCORMICK.

Witnesses:
FRANK D. THOMASON,
FLORENCE MITCHELL.